United States Patent
Xue et al.

(10) Patent No.: US 9,679,064 B2
(45) Date of Patent: Jun. 13, 2017

(54) METHOD AND APPARATUS FOR PROVIDING USER-CORRECTED SEARCH RESULTS

(75) Inventors: Wenwei Xue, Beijing (CN); Zhanjiang Song, Beijing (CN); Ling Feng, Beijing (CN); Jianwen Chen, Beijing (CN)

(73) Assignee: Nokia Technologies Oy, Espoo (FI)

( * ) Notice: Subject to any disclaimer, the term of this patent is extended or adjusted under 35 U.S.C. 154(b) by 202 days.

(21) Appl. No.: 14/123,833

(22) PCT Filed: Jun. 30, 2011

(86) PCT No.: PCT/CN2011/076638
§ 371 (c)(1),
(2), (4) Date: Dec. 4, 2013

(87) PCT Pub. No.: WO2013/000145
PCT Pub. Date: Jan. 3, 2013

(65) Prior Publication Data
US 2014/0095496 A1    Apr. 3, 2014

(51) Int. Cl.
*G06F 17/30* (2006.01)

(52) U.S. Cl.
CPC .... *G06F 17/30867* (2013.01); *G06F 17/3053* (2013.01); *G06F 17/30648* (2013.01); *G06F 17/30651* (2013.01)

(58) Field of Classification Search
CPC ......... G06F 17/30867; G06F 17/30011; G06F 17/30424; G06F 17/3053; G06F 17/30646; G06F 17/30699; G06F 17/30722
USPC ......... 707/999.005, 706, 732, 749, 750, 752
See application file for complete search history.

(56) References Cited

U.S. PATENT DOCUMENTS

| | | | |
|---|---|---|---|
| 6,012,053 A * | 1/2000 | Pant | G06F 17/30696 |
| 6,873,982 B1 | 3/2005 | Bates et al. | |
| 7,243,102 B1 | 7/2007 | Naam et al. | |
| 7,603,349 B1 | 10/2009 | Kraft et al. | |
| 7,716,218 B1 * | 5/2010 | Pogue | G06F 17/30867 707/728 |

(Continued)

FOREIGN PATENT DOCUMENTS

| | | |
|---|---|---|
| CN | 1867908 A | 11/2006 |
| CN | 101216837 A | 7/2008 |
| CN | 102023991 A | 4/2011 |

OTHER PUBLICATIONS

Dalvi et al., "Efficient Query Evaluation on Probabilistic Databases", The International Journal on Very Large Data Bases, vol. 16, No. 4, Oct. 2007, pp. 523-544.

(Continued)

*Primary Examiner* — Dennis Truong
(74) *Attorney, Agent, or Firm* — Ditthavong & Steiner, P.C.

(57) ABSTRACT

An approach is provided for providing user-corrected search results. The explanation platform processes and/or facilitates a processing of one or more search results to calculate a ranking of the one or more search results. Next, the explanation platform determines one or more parameters related to calculating the ranking, one or more values of the one or more parameters, or a combination thereof. Then, the explanation platform causes, at least in part, a presentation of one or more representations of at least one of the one or more parameters as one or more explanations for the ranking.

20 Claims, 15 Drawing Sheets

(56) References Cited

U.S. PATENT DOCUMENTS

| | | |
|---|---|---|
| 7,836,057 B1 | 11/2010 | Micaelian et al. |
| 7,856,413 B2 | 12/2010 | Cradick et al. |
| 8,140,526 B1* | 3/2012 | Zhang ............... G06F 17/30687 |
| | | 707/730 |
| 8,166,026 B1* | 4/2012 | Sadler ............... G06F 17/30867 |
| | | 707/722 |
| 8,972,396 B1* | 3/2015 | Zhang ............... G06F 17/30864 |
| | | 707/730 |
| 2002/0129015 A1* | 9/2002 | Caudill ............... G06F 17/3069 |
| 2004/0210491 A1* | 10/2004 | Sadri ..................... G06Q 30/02 |
| | | 705/12 |
| 2005/0097188 A1 | 5/2005 | Fish |
| 2006/0224577 A1* | 10/2006 | Hullender ......... G06F 17/30864 |
| 2007/0005686 A1 | 1/2007 | Fish et al. |
| 2007/0043723 A1* | 2/2007 | Bitan ................ G06F 17/30864 |
| 2007/0050339 A1* | 3/2007 | Kasperski ......... G06F 17/30967 |
| 2007/0112738 A1* | 5/2007 | Livaditis ........... G06F 17/30424 |
| 2008/0016053 A1* | 1/2008 | Frieden ............. G06F 17/30864 |
| 2008/0082528 A1 | 4/2008 | Bonzi et al. |
| 2008/0301118 A1* | 12/2008 | Chien ............... G06F 17/30873 |
| 2009/0006356 A1* | 1/2009 | Liao ................. G06F 17/30867 |
| 2009/0019035 A1* | 1/2009 | House ............... G06F 17/30675 |
| 2009/0216742 A1 | 8/2009 | Coffman et al. |
| 2009/0254537 A1* | 10/2009 | Yoshio ............... G06F 17/30256 |
| 2010/0082610 A1 | 4/2010 | Anick et al. |
| 2010/0082639 A1 | 4/2010 | Li et al. |
| 2010/0169376 A1 | 7/2010 | Chu |
| 2010/0228715 A1* | 9/2010 | Lawrence ........... G06F 17/3053 |
| | | 707/706 |
| 2010/0274783 A1* | 10/2010 | Chevalier ......... G06F 17/30545 |
| | | 707/723 |
| 2010/0287475 A1 | 11/2010 | Van Zwol et al. |
| 2011/0022590 A1 | 1/2011 | Yu |
| 2011/0066607 A1 | 3/2011 | Wong |
| 2012/0078870 A1* | 3/2012 | Bazaz ............... G06F 17/30247 |
| | | 707/706 |
| 2012/0130858 A1* | 5/2012 | Kiss ....................... G06Q 30/06 |
| | | 705/26.64 |
| 2014/0181098 A1* | 6/2014 | Bhandari .......... G06F 17/30722 |
| | | 707/728 |

OTHER PUBLICATIONS

Extended European Search Report received for corresponding European Patent Application No. 11868478.6, dated May 21, 2015, 6 pages.

International Search Report and Written Opinion received in corresponding Patent Cooperation Treaty Organization application No. PCT/CN2011/076638. Dated Apr. 5, 2012. 11 pages.

Office Action for corresponding Chinese Patent Application No. 201180071903.3, dated Oct. 25, 2016, English Language Summary Included, 14 pages.

* cited by examiner

METHOD AND APPARATUS FOR PROVIDING USER-CORRECTED SEARCH RESULTS

RELATED APPLICATION

This application was originally filed as PCT Application No. PCT/CN2011/076638 filed Jun. 30, 2011.

BACKGROUND

Service providers and device manufacturers (e.g., wireless, cellular, etc.) are continually challenged to deliver value and convenience to consumers by, for example, providing compelling network services. One area of interest has been providing search results to users. For example, search results are often ranked based on an internal system ranking algorithm. Subsequently, search results associated with high rank values are typically placed toward the top of a search results list presented to a user while search results with low rank values are placed toward the bottom of the list. In general, however, there are intrinsic uncertainties associated with these conventional methods of search results ranking or ordering. Particularly, these search results may not truly reflect the interests of a particular user at a particular time, for instance, because there are human aspects of "ad-hoc" context that cannot be sensed by technological means. Moreover, although some services allow for user feedback, the user is usually unaware of the particular variables that go into calculating the ranking associated with the search results. Consequently, the search results may not be personalized for the specific user in real time.

SOME EXAMPLE EMBODIMENTS

Therefore, there is a need for an approach for providing user-corrected search results.

According to one embodiment, a method comprises processing and/or facilitating a processing of one or more search results to calculate a ranking of the one or more search results. The method also comprises determining one or more parameters related to calculating the ranking, one or more values of the one or more parameters, or a combination thereof. The method further comprises causing, at least in part, a presentation of one or more representations of at least one of the one or more parameters as one or more explanations for the ranking.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of one or more search results to calculate a ranking of the one or more search results. The apparatus is also caused to determine one or more parameters related to calculating the ranking, one or more values of the one or more parameters, or a combination thereof. The apparatus is further caused to present one or more representations of at least one of the one or more parameters as one or more explanations for the ranking.

According to another embodiment, a computer-readable storage medium carries one or more sequences of one or more instructions which, when executed by one or more processors, cause, at least in part, an apparatus to process and/or facilitate a processing of one or more search results to calculate a ranking of the one or more search results. The apparatus is also caused to determine one or more parameters related to calculating the ranking, one or more values of the one or more parameters, or a combination thereof. The apparatus is further caused to present one or more representations of at least one of the one or more parameters as one or more explanations for the ranking.

According to another embodiment, an apparatus comprises means for processing and/or facilitating a processing of one or more search results to calculate a ranking of the one or more search results. The apparatus also comprises means for determining one or more parameters related to calculating the ranking, one or more values of the one or more parameters, or a combination thereof. The apparatus further comprises means for causing, at least in part, a presentation of one or more representations of at least one of the one or more parameters as one or more explanations for the ranking.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing user-corrected search results are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
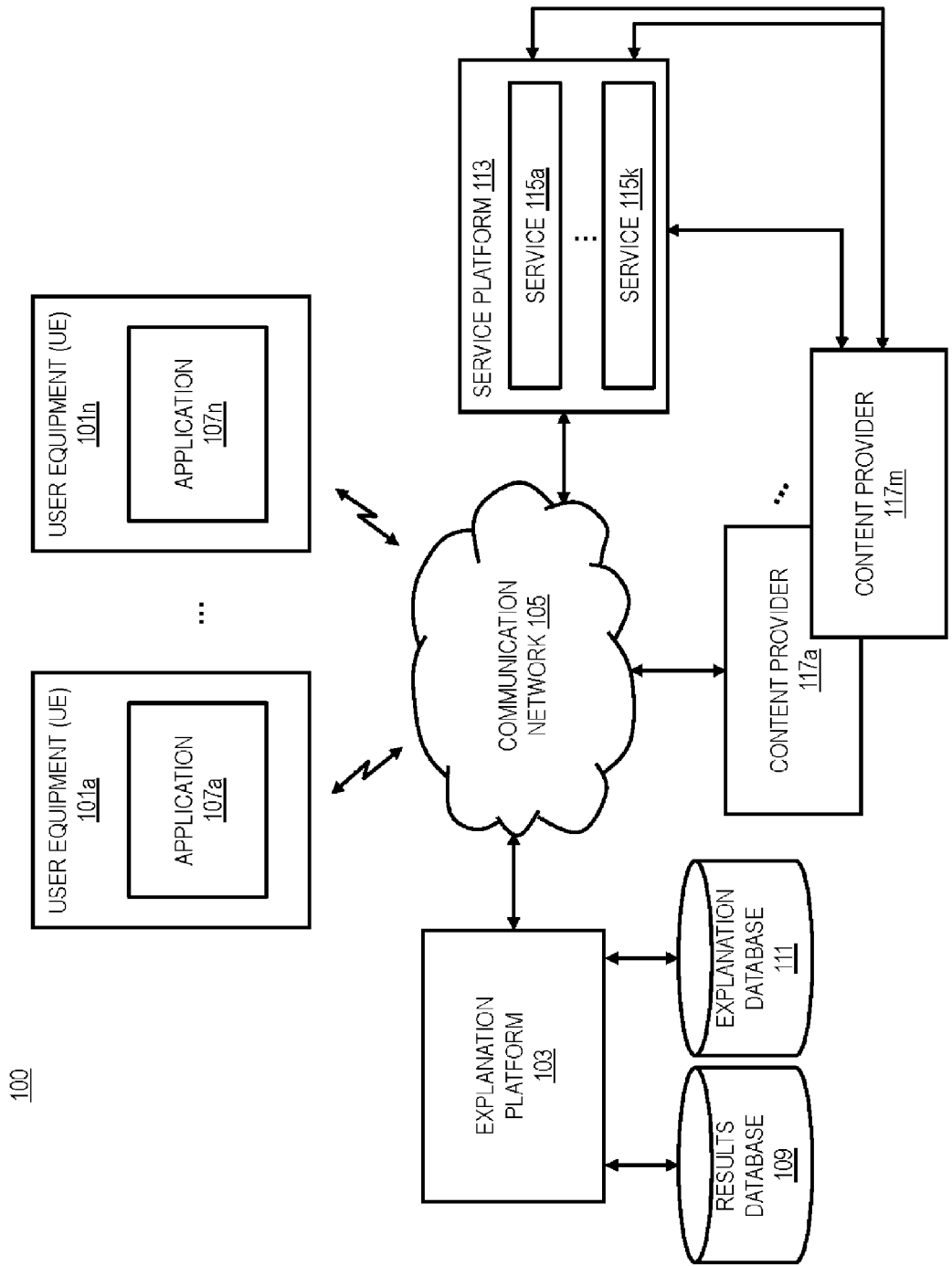
FIG. 1 is a diagram of a system capable of providing user-corrected search results, according to one embodiment.

FIG. 1 is a diagram of a system capable of providing user-corrected search results, according to one embodiment. As mentioned, traditional search services provide and present search results based on an internal system ranking algorithm that rely on intrinsic uncertainties. Specifically, these intrinsic uncertainties may relate to the "ad-hoc" context of users that cannot be correctly sensed by technological means. As such, these search results may not reflect the personalization that a particular user desires, for instance, at the time of the search. Users, on the other hand, are actually use to and highly successful in coping with uncertain data throughout their daily lives as most human knowledge in the real world is uncertain. Particularly, in some instance, users may be better than a machine at deciding what they currently want under the current circumstances. However, although some services allow a user to provide feedback (e.g., providing an overall rating for an item), the user may be unable to apply their "ad-hoc" decision-making abilities to adequately personalize the search results because the user may not understand how a particular rank value for a result is calculated. Thus, the search results may continue to remain as an insufficient reflection of the user's interests.

To address this problem, a system 100 of FIG. 1 introduces the capability to provide user-corrected search results. Specifically, the system 100 may present representations of particular parameters to explain the ranking of search results, for instance, to a user to enable the user to make ranking adjustments based on the circumstances at the time of the search (e.g., "ad-hoc" context). By way of example, the system 100 may present at least one of the parameters related to calculating a ranking for particular search results to the user in a way that would enable the user to understand how the ranking for the user's search results is constructed. The representations of the parameters may, for instance, be presented to the user as explanations for the ranking (e.g., what went into calculating the ranking of particular search results). The ranking, the parameters, the parameter values, the presentation, etc., may specifically be for the device presenting the explanations and/or for the user of the device. For example, the current ranking, the parameters utilized to construct the ranking, the parameter values, and the presentation may have been based on previous requests by the user to modify certain parameters (e.g., changing parameter values) or remove certain parameters from being considered in calculating the ranking. Additionally, the ranking, the parameters, and the parameter values may be based on context information associated with the device and/or the user. Based on the ranking explanations, the user may want to provide feedback to further personalize the search results, for instance, by modifying parameters or removing parameters from being considered in calculating the ranking. Consequently, the search results may immediately be personalized for the user for the particular moment.

In one sample use case, a user's query may produce a list of search results on the user's device, where the list includes Item X as the first result, Item Y as the second result, and Item Z as the third result. On the list, several explanations are also included next to each of the results (e.g., Item X, Item Y, and Item Z). These explanations may, for instance, include Product Quality, Seller Reputation, and Item Location. Product Quality, Seller Reputation, and Item Location may correspond to parameters having the most influence on the results ranking (e.g., Production Quality amounts to 40%, Seller Reputation amounts to 40%, Item Location amounts to 10%, and Other Parameters amount to 10%). As such, if the user's device can only feature three specific explanations (e.g., set by user preference, based on resolution size, etc.), then those three explanations may be the only specific explanations shown to the user. In this example, Product Quality may relate to how experts and/or users have rated the item quality, Seller Reputation may relate to how consumers have rated the particular seller of a particular item, and Item Location may relate to how close the item is in relation to the user. Based on a scale from 0.0 to 1.0 with 1.0 being the highest rating possible, the following may be presented to the user:

TABLE 1

| Item Results | Overall Ranking | Product Quality (40%) | Seller Reputation (40%) | Item Location (10%) | Other Parameters (10%) |
|---|---|---|---|---|---|
| Item X | 0.75 | 0.8 | 0.8 | 0.5 | 0.6 |
| Item Y | 0.67 | 0.7 | 0.6 | 0.8 | 0.7 |
| Item Z | 0.64 | 0.6 | 0.8 | 0.2 | 0.6 |

Upon seeing the explanations (e.g., corresponding to the parameters, parameter values, etc.) in Table 1, the user may disagree with a certain currently assigned rating or the impact that a particular explanation may have on the ranking. Thus, the user may want to make modifications to particular parameters, parameter values, etc., or remove certain parameters, parameter values, etc. For instance, the user may not care very much about the item's location because the items may be shipped to the user and the user may be able to wait for the shipment. As such, the user can assign a lower impact value to Item Location (e.g., from 10% to 5%) or the user can remove Item Location from consideration altogether. In addition, the user may have had a very bad experience with a particular seller (e.g., seller associated with Item Y). Accordingly, the user may lower the Seller Reputation rating assigned to the particular seller. As an example, the user may change the Item Location impact value from 10% to 5%, the Other Parameters impact value from 10% to 15%, and the Seller Reputation rating for Item Y from 0.6 to 0.2. Consequently, the modifications may immediately produce the following for the user:

TABLE 2

| Item Results | Overall Ranking | Product Quality (40%) | Seller Reputation (40%) | Item Location (5%) | Other Parameters (15%) |
|---|---|---|---|---|---|
| Item X | 0.755 | 0.8 | 0.8 | 0.5 | 0.6 |
| Item Z | 0.660 | 0.6 | 0.8 | 0.2 | 0.6 |
| Item Y | 0.535 | 0.7 | 0.2 | 0.8 | 0.7 |

As shown in Table 2, the search results order has changed based on the ranking. Item Y which was previously the second result on the list is now the third result and Item Z which was previously the third result on the list is now the second result.

More specifically, the system 100 may process and/or facilitate a processing of one or more search results to calculate a ranking of the one or more search results. The ranking calculation may be based on an explicit query for search results (e.g., entering search terms into a search engine) or an implicit query for search results (e.g., getting recommendations by opening a service application). As such, the system 100 may determine one or more parameters related to calculating the ranking, one or more values of the one or more parameters, or a combination thereof. The system 100 may then cause, at least in part, a presentation of one or more representations of at least one of the one or more parameters as one or more explanations for the ranking. As mentioned, the ranking, the one or more parameters, the one or more values, and/or the presentation may be for a device initiating the presentation and/or at least one user of the device. Moreover, the ranking, the one or more parameters, the one or more values, and/or the presentation may be based on (a) one or more previous modification and/or removal requests and/or (b) context information associated with a device initiating the presentation and/or at least one user of the device.

As shown in FIG. 1, the system 100 comprises a user equipment (UE) 101 having connectivity to an explanation platform 103 via a communication network 105. The UE 101 may include or have access to an application 107 (e.g., applications 107a-107n) to enable the UE 101 to interact with, for instance, the explanation platform 103 to present one or more explanations associated with a search results ranking, request modifications and/or removal of particular parameters, parameter values, etc., to update the rankings, etc. The explanation platform 103 may include or have access to a results database 109 to access or store results data. The explanation platform 103 may also include or have access to an explanation database 111 to access or store parameters that may be utilized to calculate rankings associated with search results. Moreover, the results database 109 and/or the explanation database 111 may include content associated with the results data and the parameters. Alternatively, or additionally, the results database 109 and/or the explanation database 111 may include one or more links to access or obtain content. The content may, for instance, be provided by a service platform 113, one or more services 115 (or services 115a-115k), one or more content providers 117 (or content providers 117a-117m), and/or other services available over the communication network 105. For example, a particular service 115 (e.g., a music or video service) may obtain content (e.g., media content) from a particular content provider 117 to offer the content to the UE 101. Accordingly, the link may be an address or some other identifier that points to a memory or storage location associated with the service platform 113, the services 115, and/or the content providers 117. It is noted that the explanation platform 103 may be a separate entity of the system 100, a part of the one or more services 115 of the service platform 113, or included within the UE 101 (e.g., as part of the application 107).

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In another embodiment, the explanation platform 103 may receive a request for a modification and/or a removal of the one or more parameters and/or the one or more values. The request may, for instance, be initiated when at least one user (e.g., of the device initiating the presentation) elects to make a change to a current search results list. These changes may be initiated directly on the device (e.g., making a selection to modify or delete), including modifications or removal of the one or more representations, the one or more explanations, the one or more parameters, the one or more values, etc. As an example, a removal of a particular representation may remove a corresponding parameter from being considered when the ranking is calculated (or recalculated). Moreover, the request may include at least one assigned value by the at least one user of the device for updating the one or more values. Therefore, the explanation platform 103 may then cause a recalculation of the ranking based on the modification and/or the removal. As described, the recalculation of the ranking may immediately update the ranking as well as the presentation to the at least one user. By way of example, the search results list shown to the at least one user may be updated to reflect the updated ranking.

In another embodiment, the explanation platform 103 may determine that the recalculation is for a subset of the one or more parameters and/or the one or more values. As such, the explanation platform 103 may then cause an application of the recalculation to the subset. In this way, the explanation platform 103 may reduce the amount of resources (e.g., processing resources, memory resources, network resources, power resources, etc.) required to process the recalculation. As illustrated in the simplified examples of Tables 1 and 2, the user changed the Item Location impact value from 10% to 5%, the Other Parameters impact value from 10% to 15%, and the Seller Reputation rating for Item Y from 0.6 to 0.2. In this case, it would be more efficient (and still produce the same outcome) to perform a recalculation only with respect to parameters and values associated with Item Location, Other Parameters, and Item Y compared to a recalculation on all of the one or more parameters and the one or more values.

In another embodiment, the explanation platform 103 may determine one or more criteria for selecting the one or more parameters, wherein the ranking is based on the one or more criteria. In one scenario, the explanation platform 103 may determine that only k number of parameters are required to efficiently perform a ranking calculation. Accordingly, in order to limit the number of parameters for the ranking calculation to k number of parameters, the one or more parameters may be selected by the impact (or the influence) that a particular parameter may have on the overall ranking. After k number of parameters have been selected as the one or more parameters for the ranking calculation, the explanation platform 103 may then ignore other parameters and perform computations based on the selected one or more parameters. In this way, not only may the ranking be computed faster, but resources may also be saved.

In another embodiment, the explanation platform 103 may determine effect information related to an impact of the one or more parameters on the ranking. The explanation platform 103 may then determine to select the at least one of the one or more parameters based on the effect information, wherein the presentation is based on the selection. As an example, the number of parameters for each search result may be very high. Accordingly, it may be preferable to limit the number of parameters (e.g., in the form of parameter representations) that are explained (e.g., limit the number of explanations) to users, for instance, to alleviate the burden on users since too many explanations may cause confusion or be overwhelming (e.g., presenting too much information, requiring users to scroll horizontally and vertically, etc.). Thus, the number of representations presented to the user may be less than the number of parameters utilized in the ranking calculation. If, for instance, the number of representations to be presented is limited to m number of representations, the presentation may be restricted to representations associated with the top m parameters with respect to the impact that the parameters have on the ranking.

In another embodiment, the explanation platform 103 may process and/or facilitate a processing of a search query associated with the one or more search results to formulate an expression including one or more independent elements corresponding to the one or more parameters. The explanation platform 103 may then determine to construct a tree structure including one or more leaf nodes corresponding to the one or more independent elements based on the expression, wherein the ranking and/or the recalculation of the ranking is based on the tree structure. By way of example, computing the probability of a complex event expression has been proved to be either in PTIME or #P-complete. Nonetheless, it may be possible to take a query expression with independent basic events and reformulate the expression into an equivalent expression such that each event identifier does not occur repeatedly, and the different sub-expressions are independent and do not overlap. For example, ee=$(e_1 \land e_2) \lor (e_1 \land e_3)$ can be transformed into ee'=$e_1 \land (e_2 \lor e_3)$, where $e_1$, $e_2$, and $e_3$ are independent. The latter's probability can thus be computed as P(ee')=P($e_1 \land (e_2 \lor e_3)$)=P($e_1$)*P($e_2 \lor e_3$)=P($e_1$)*(P($e_2$)+P($e_3$)−P($e_2$)*P($e_3$)). As such, the ranking calculations may be performed efficiently with a linear time complexity.

In another embodiment, the explanation platform 103 may process and/or facilitate a processing of the tree structure to identify at least one leaf node corresponding to the request for the modification and/or the removal, wherein the recalculation is performed for the at least one leaf node and one or more other nodes along one or more paths from the at least one leaf node to a root node. In this way, the explanation platform 103 may be able to avoid recalculations on nodes that are not affected by the modification and/or the removal. Accordingly, as compared with a recalculation of all the nodes, the amount of resources necessary to process the recalculation is substantially reduced.

By way of example, the UE 101, the explanation platform 103, the service platform 113, and the content providers 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
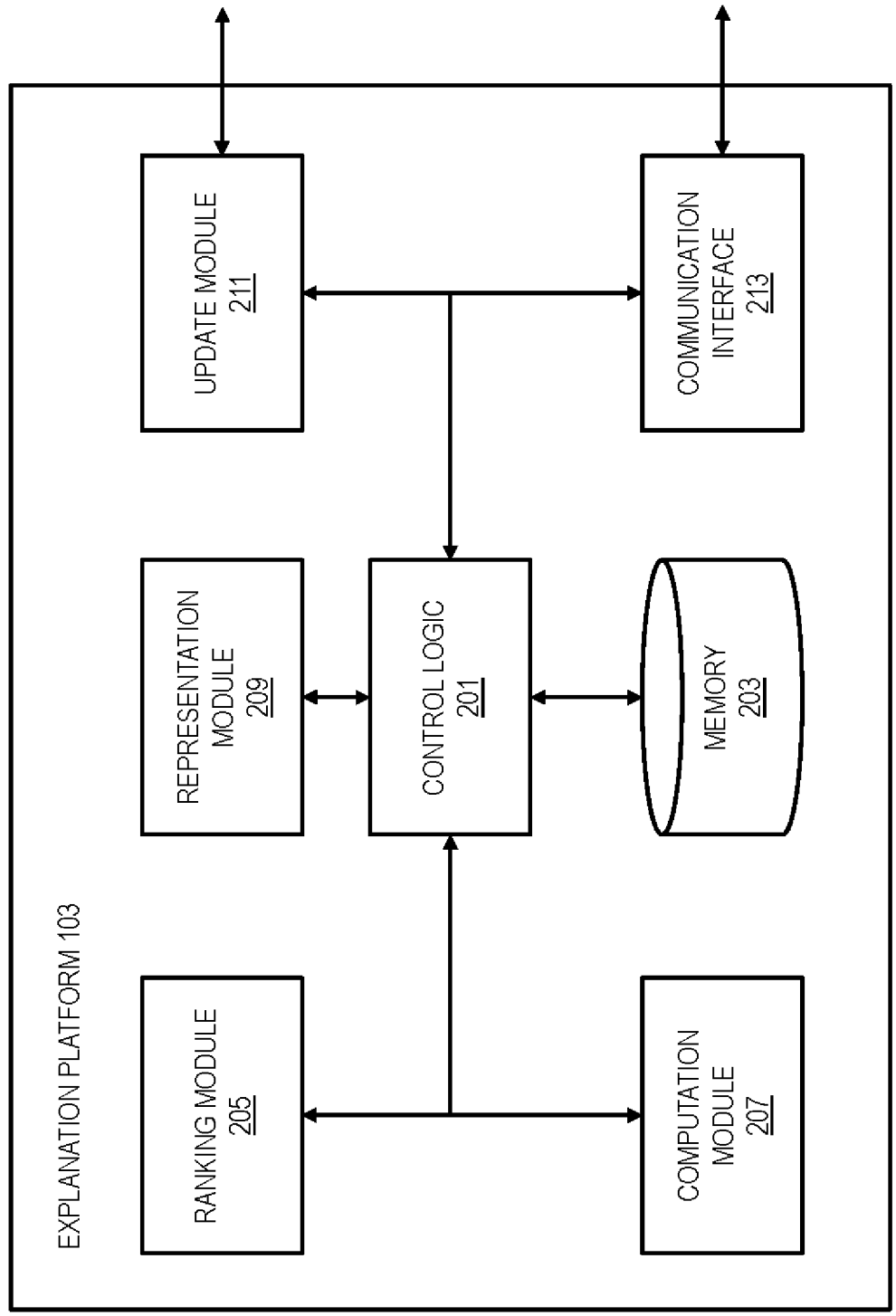
FIG. 2 is a diagram of the components of an explanation platform, according to one embodiment.

FIG. 2 is a diagram of the components of an explanation platform, according to one embodiment. By way of example, the explanation platform 103 includes one or more components for providing user-corrected search results. It is contemplated that the functions of these components may be combined in one or more components or performed by other components of equivalent functionality. In this embodiment, the explanation platform 103 includes control logic 201, memory 203, a ranking module 205, a computation module 207, a representation module 209, an update module 211, and a communication interface 213.

The control logic 201 executes at least one algorithm for executing functions of the explanation platform 103. For example, the control logic 201 may interact with the ranking module 205 to process search results to calculate a ranking for the search results. The ranking module 205 may, for instance, utilize one or more criteria to select the parameters for calculating the ranking. After selecting the parameters, the ranking module 205 may provide the parameters to the computation module 207, which may then process the parameters and/or the parameter values to calculate the ranking.

Next, the control logic 201 may direct the representation module 209 to determine the parameters related to calculating the ranking and/or the parameter values. The representation module 209 may further determine effect information related to an impact of the parameters on the ranking. Based on the effect information, the representation module 209 may, for instance, then select a subset of the parameters to present to the user (e.g., in the form of representations) as explanations for the ranking.

In addition, the control logic 201 may work with the update module 211 to recalculate the ranking for the user. By way of example, the update module 211 may receive a request for a modification and/or a removal of particular parameters and/or parameter values. To avoid performing a recalculation on all of the parameters and parameter values, the update module 211 may determine that the recalculation is for a subset of the parameters and parameter values. As such, the update module 211 may inform the ranking module 205 and the computation module 207 to limit the application of the recalculation process to the determined subset. As such, the recalculation may then be performed on the determined subset based on the requested modification and/or removal.

The control logic 201 may also utilize the communication interface 213 to communicate with other components of the explanation platform 103, the UEs 101, the service platform 113, the content providers 117, and other components of the system 100. For example, the communication interface 213 may assist in receiving the request for the modification and/or the removal of particular parameters and/or parameter values. The communication interface 213 may further include multiple means of communication. In one use case, the communication interface 213 may be able to communicate over SMS, internet protocol, instant messaging, voice sessions (e.g., via a phone network), or other types of communication.

Figure 3:
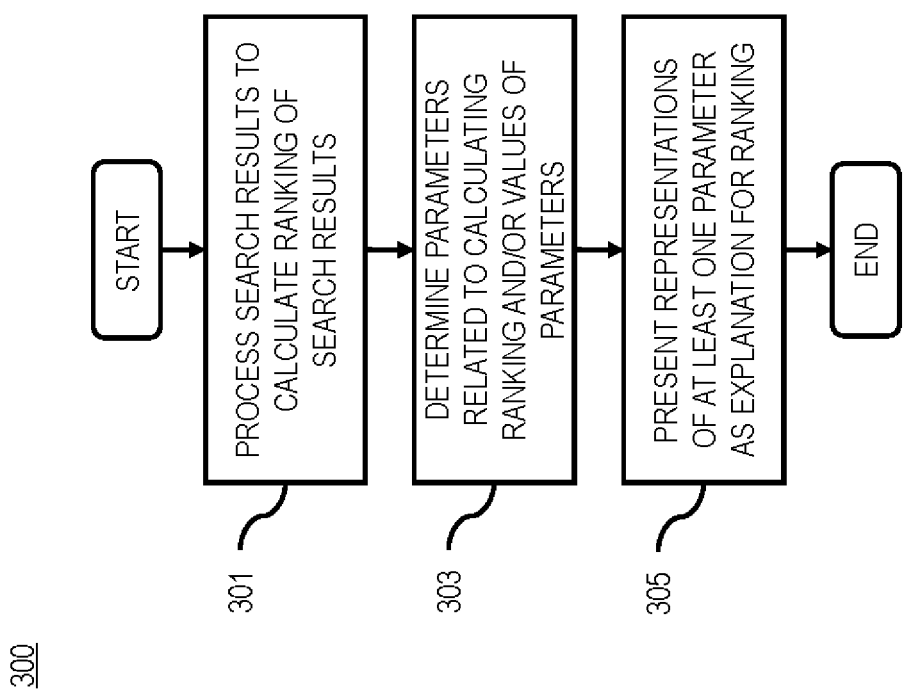
FIG. 3 is a flowchart of a process for providing user-corrected search results, according to one embodiment.
Figure 11:
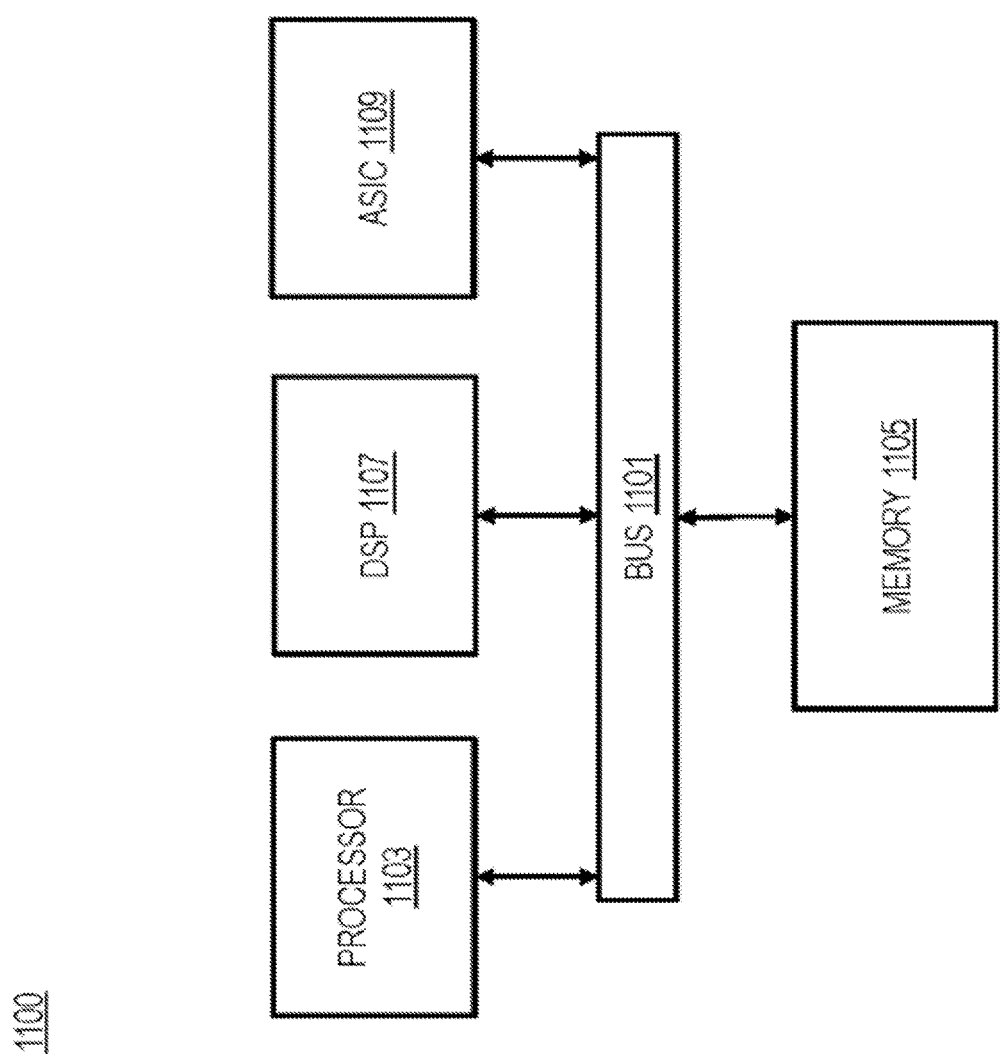
FIG. 11 is a diagram of a chip set that can be used to implement an embodiment of the invention.

FIG. 3 is a flowchart of a process for providing user-corrected search results, according to one embodiment. In one embodiment, the control logic 201 and/or other components of the explanation platform 103 performs the process 300 and is implemented in, for instance, a chip set including a processor and a memory as shown in FIG. 11. As such, the control logic 201 can provide means for accomplishing various parts of the process 300 as well as means for accomplishing other processes in conjunction with other components of the explanation platform 103.

In step 301, the control logic 201 may process and/or facilitating a process of one or more search results to calculate a ranking of the one or more search results. As discussed, the ranking calculation may be based on an explicit query for search results (e.g., entering search terms into a search engine) or an implicit query for search results (e.g., getting recommendations by opening a service application). Moreover, the ranking may be based on one or more criteria for selecting one or more parameters to be utilized for the ranking calculation. As an example, the one or more parameters may be selected by the impact (or the influence) that a particular parameter may have on the ranking. As such, the control logic 201 may, as in step 303, determine the one or more parameters related to calculating the ranking and/or one or more values of the one or more parameters.

Further, in step 305, the control logic 201 may cause a presentation of one or more representations of at least one of the one or more parameters as one or more explanations for the ranking. As mentioned, the ranking, the one or more parameters, the one or more values, and/or the presentation may be for a device initiating the presentation and/or at least one user of the device. Moreover, the ranking, the one or more parameters, the one or more values, and/or the presentation may be based on (a) one or more previous modification and/or removal requests (b) and/or context information associated with a device initiating the presentation and/or at least one user of the device.

Figure 4:
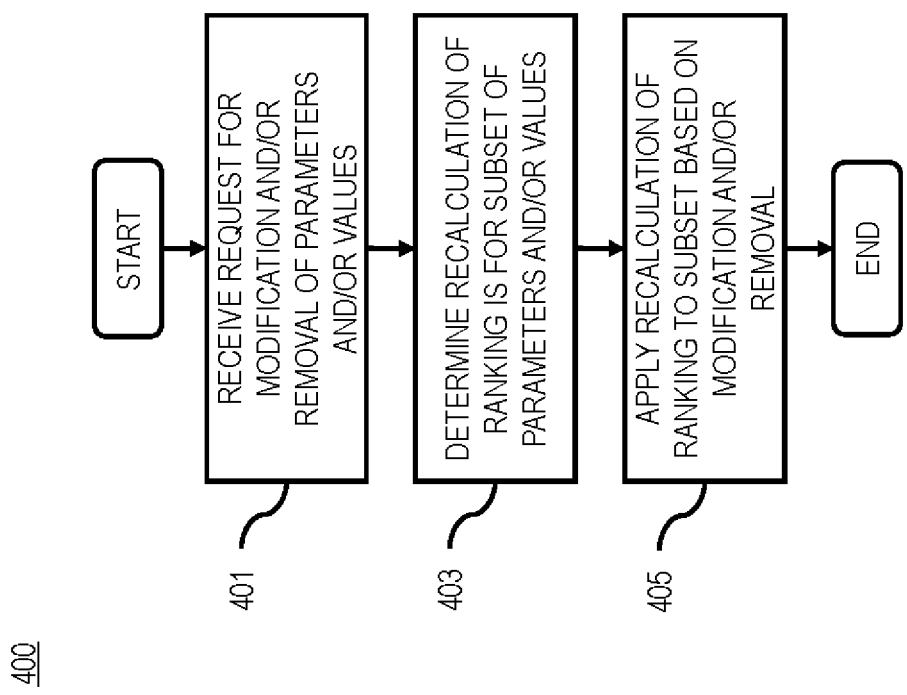
FIG. 4 is a flowchart of a process for performing a ranking recalculation, according to one embodiment.

FIG. 4 is a flowchart of a process for performing a ranking recalculation, according to one embodiment. In one embodiment, the control logic 201 and/or other components of the explanation platform 103 performs the process 400 and is implemented in, for instance, a chip set including a processor and a memory as shown in FIG. 11. As such, the control logic 201 can provide means for accomplishing various parts of the process 400 as well as means for accomplishing other processes in conjunction with other components of the explanation platform 103.

In step 401, the control logic 201 may receive a request for a modification and/or a removal of the one or more parameters and/or the one or more values. As discussed, the request may, for instance, be initiated when at least one user (e.g., of the device initiating the presentation) elects to make a change with respect to the ranking (e.g., a list order of the one or more search results). These changes may be initiated directly on the device (e.g., making a selection to modify or delete), including modifications or removal of the one or more representations, the one or more explanations, the one or more parameters, the one or more values, etc. As an example, a removal of a particular representation may remove a corresponding parameter from being considered when the ranking is calculated (or recalculated). Moreover, the request may include at least one assigned value by the at least one user of the device for updating the one or more values.

Additionally, in step 403, the control logic 201 may determine that a recalculation of the ranking should be performed for a subset of the one or more parameters and/or the one or more values. Thus, in step 405, the control logic 201 may cause an application of the recalculation to the subset based on the modification and/or the removal. By way of example, the request may only include a modification for the subset of the one or more parameters and/or the one or more values. Accordingly, it may be faster and more efficient to perform a recalculation for the subset rather than a recalculation for the entire set of the one or more parameters and/or the one or more values. As explained, such an approach may reduce the amount of resources (e.g., processing resources, memory resources, network resources, power resources, etc.) required to process the recalculation.

Figure 5:
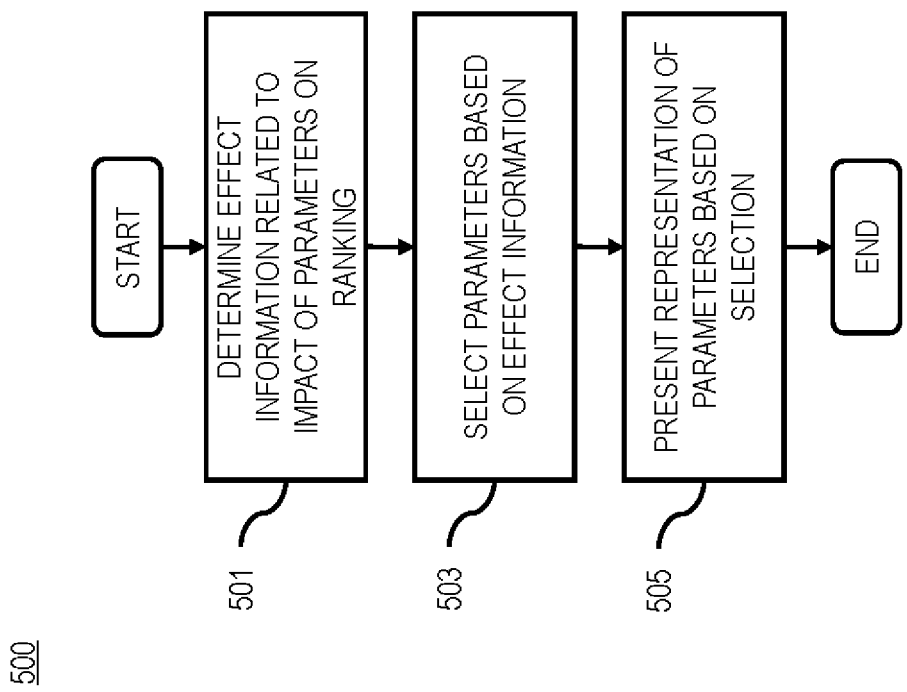
FIG. 5 is a flowchart of a process for presenting parameter representations, according to one embodiment.

FIG. 5 is a flowchart of a process for presenting parameter representations, according to one embodiment. In one embodiment, the control logic 201 and/or other components of the explanation platform 103 performs the process 500 and is implemented in, for instance, a chip set including a processor and a memory as shown in FIG. 11. As such, the control logic 201 can provide means for accomplishing various parts of the process 500 as well as means for accomplishing other processes in conjunction with other components of the explanation platform 103.

In step 501, the control logic 201 may determine effect information related to an impact of the one or more parameters on the ranking. An impact may, for instance, be the influence that a particular parameter has on an overall rank value assigned to a search result. As an example, each of the one or more search results may be associated with a rank value calculated from a large number of parameters. Thus, the effect information may, for instance, be determined based on the influence that certain parameters have on the rank value associated with each of the one or more search results. Then, in step 503, the control logic 201 may determine to select the at least one of the one or more parameters based on the effect information.

In step 505, the control logic 201 may then cause a presentation of the one or more representations of the at least one of the one or more parameters based on the selection. As mentioned, it may be preferable to limit the number of parameters (e.g., in the form of parameter representations) explained to users to alleviate the burden on users since too many explanations may cause confusion or be overwhelming. By way of example, if there are k number of parameters (e.g., the one or more parameters) utilized to calculate the ranking for the one or more search results, then m number of parameters (e.g., the at least one of the one or more parameters) from the k number of parameters will be selected as explanations to be presented to the user (e.g., in the form of parameter representations), where m≤k.

Figure 6A:
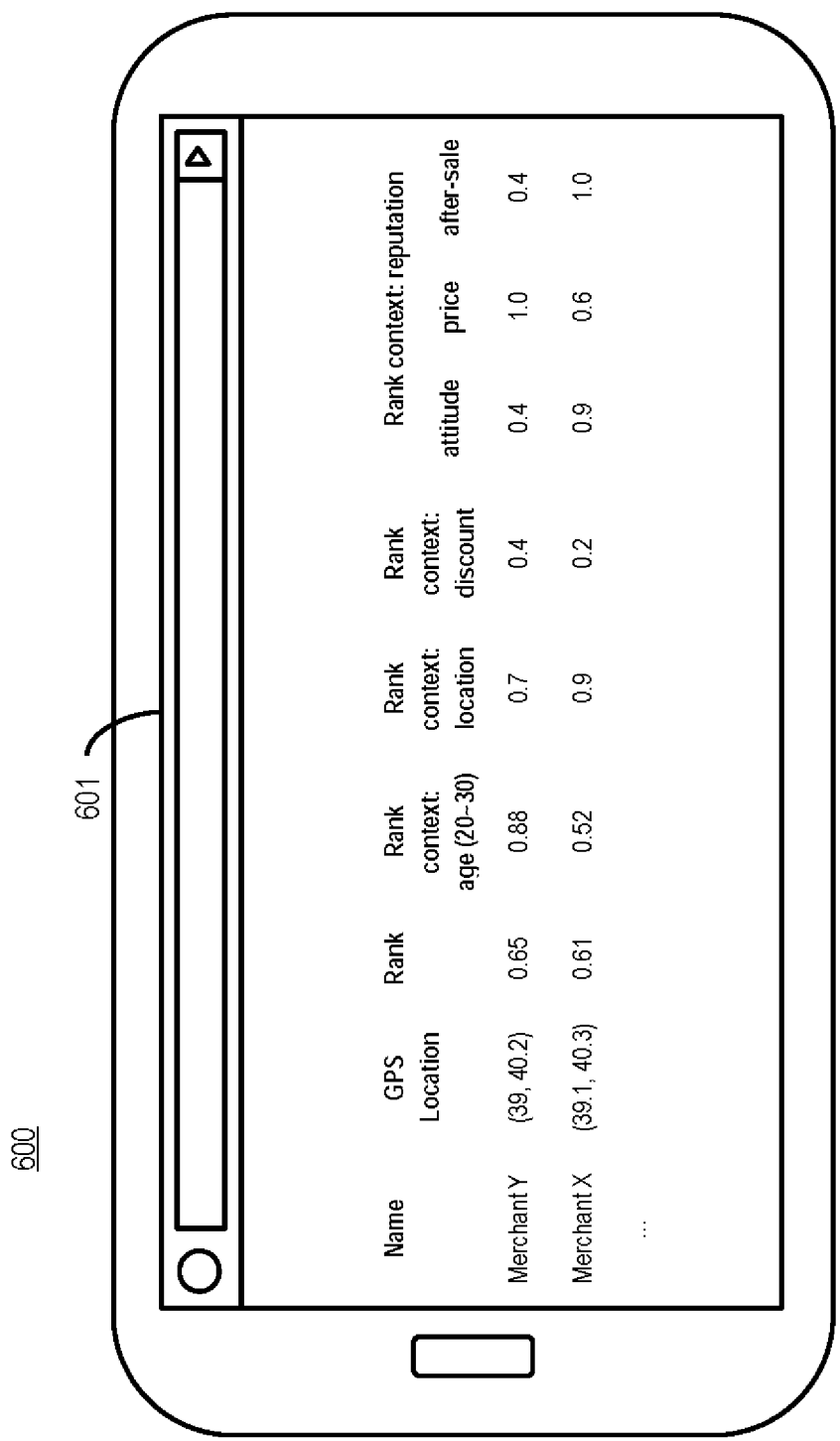
FIGS. 6A-6B are diagrams of user interfaces demonstrating merchant search results utilized in the processes of FIG. 3, according to various embodiments.
Figure 6B:
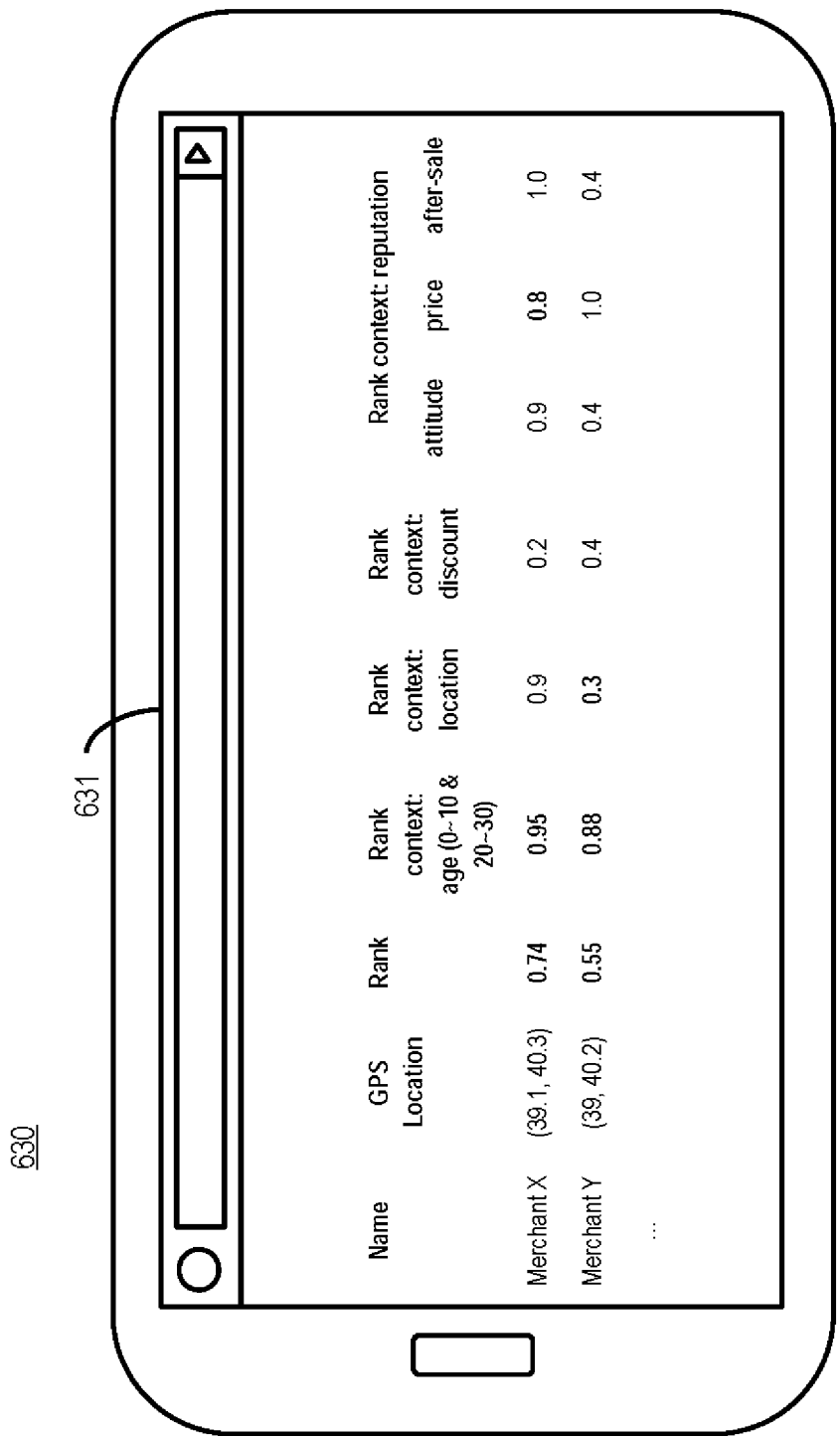

FIGS. 6A-6B are diagrams of user interfaces demonstrating merchant search results utilized in the processes of FIG. 3, according to various embodiments. FIG. 6A illustrates a user interface 600 that features a display 601. As shown, a user is presented with a search result list for merchants, which includes the merchant name, the GPS location of the merchant, and an overall rank value for the merchant along with a number of explanations (e.g., age category, location, discount, reputation, etc., along with associated values) for the overall rank value. By way of example, Merchant Y is first on the list with an overall rank value of 0.65 where the explanations include an age category rating of 0.88 for the age category 20-30 years and a location rating of 0.7 (e.g., indicating how close the merchant is from the user). Merchant X is second on the list with an overall rank value of 0.61 where the explanations include an age category rating of 0.52 for the age category 20-30 years and a location rating of 0.9. In this case, the explanations offered enable the user to understand how the overall rank value for each merchant is calculated. If, for instance, only the overall rank values (without the explanations) were shown to the user, the overall rank values may not mean very much to the user (e.g., the overall rank value is too abstract for the user).

FIG. 6B illustrates a user interface 630 that features a display 631. As shown, the user from FIG. 6A is presented with a search results list for merchants updated from the search results list provided in FIG. 6A. However, in this case, the user has modified the age category and the location explanations for the overall ranking associated with the search results. As demonstrated, the user has indicated that the user is looking for merchants associated with the age categories of 0-10 years and 20-30 years (e.g., the user is looking for products for the user and the user's children). Moreover, the user has changed the location rating for Merchant Y from 0.7 to 0.3 (e.g., the user does not like the location of Merchant Y). Consequently, a modification request is initiated at the user's device and the ranking associated with the search results is recalculated. Subsequently, the user is presented with an updated search results list. Here, Merchant X is now first on the list with an overall rank value of 0.74 where the age category explanation has an updated age category rating of 0.95. Merchant Y is now second on the list with an overall rank value of 0.55 where the age category explanation has an updated age category rating of 0.88 (although unchanged) and an updated location rating of 0.3.

Figure 7A:
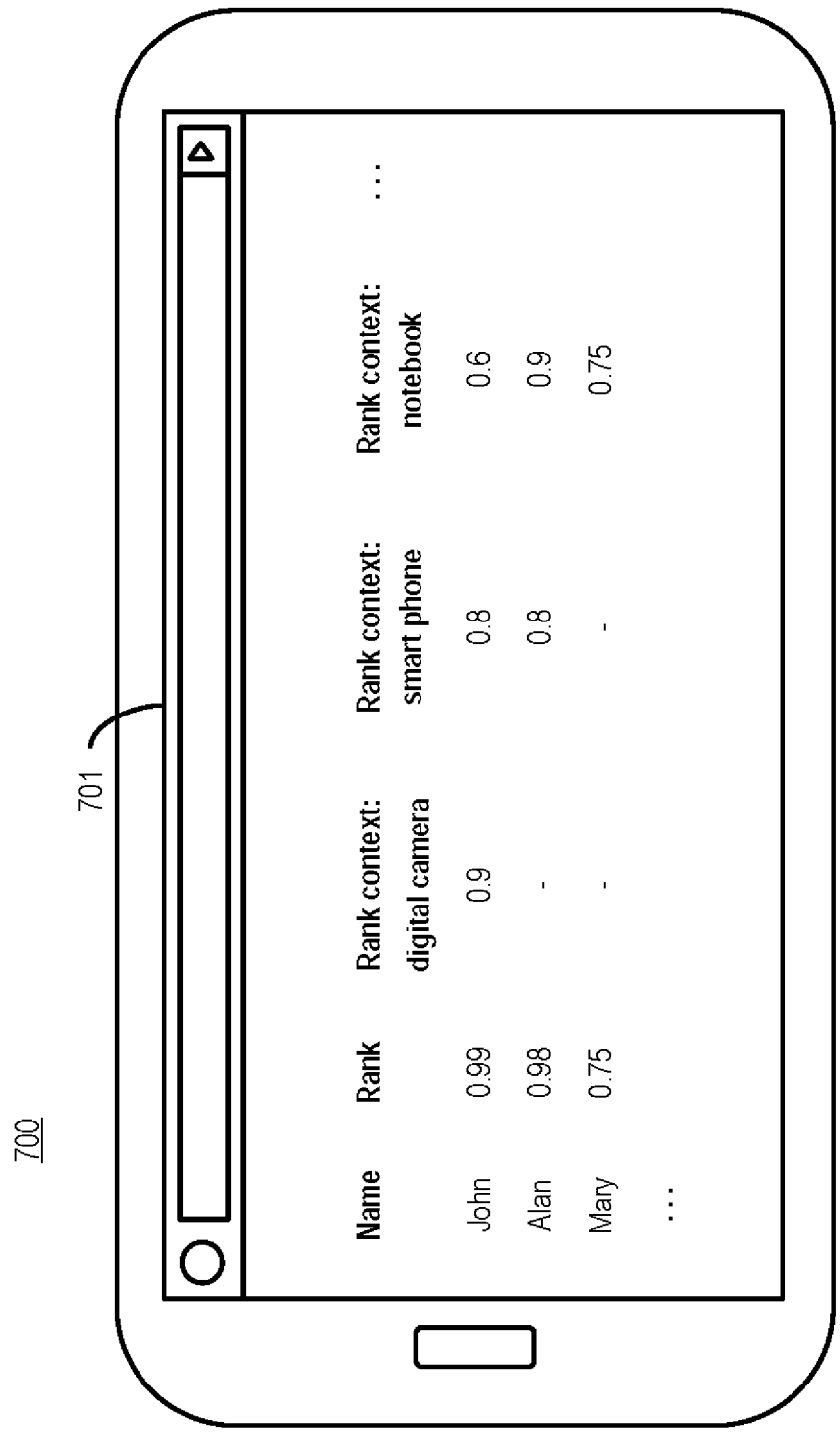
FIGS. 7A-7B are diagrams of user interfaces demonstrating group shopping candidate search results utilized in the processes of FIG. 3, according to various embodiments.
Figure 7B:
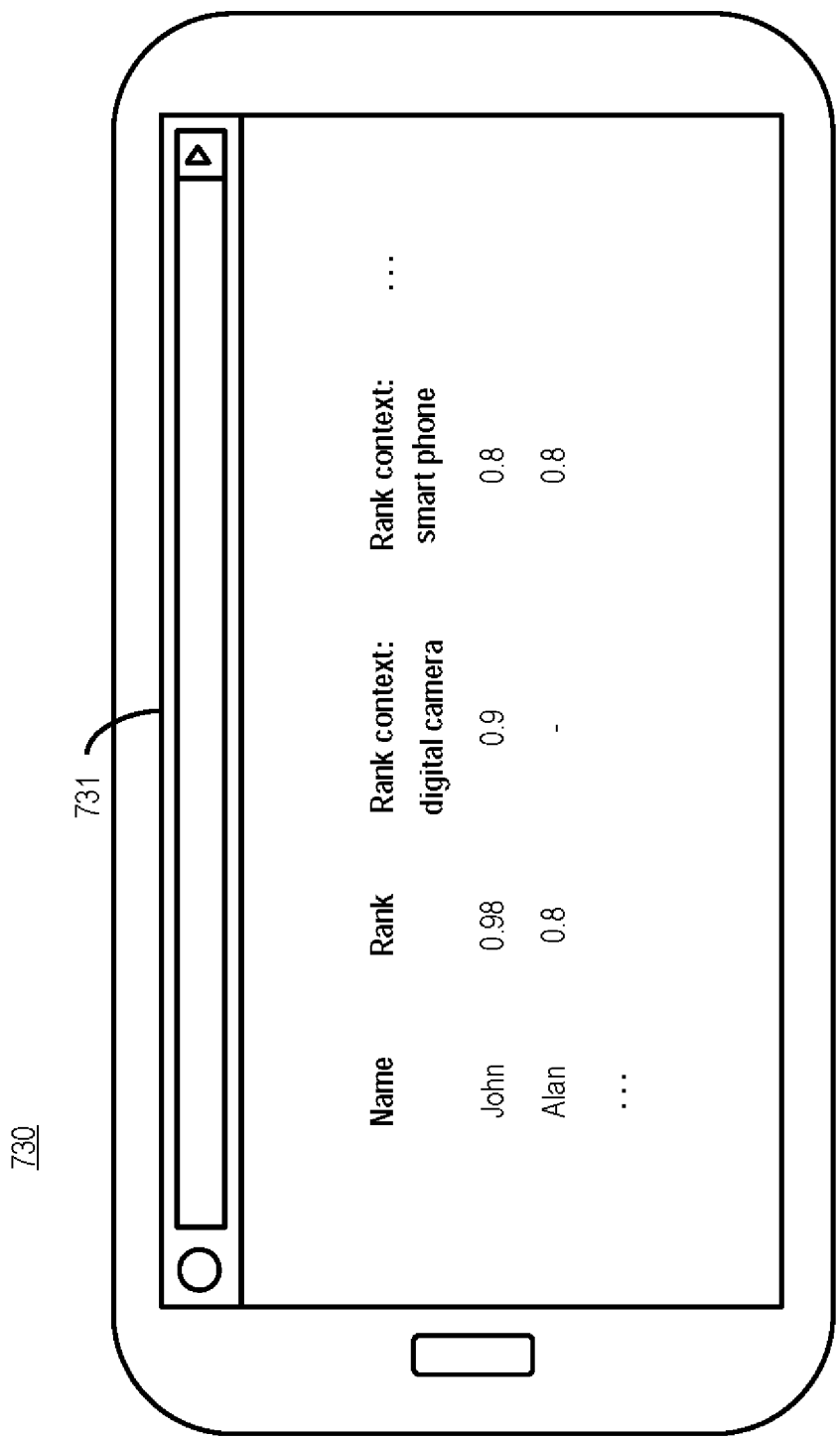

FIGS. 7A-7B are diagrams of user interfaces demonstrating group shopping candidate search results utilized in the processes of FIG. 3, according to various embodiments. FIG. 7A illustrates a user interface 700 that features a display 701. As shown, the user is presented with a search results list for group shopping candidates, which includes the candidate's name and the overall rank value for a candidate along with a number of explanations (e.g., digital camera, smart phone, notebook, etc., along with associated values) for the overall rank value. By way of example, the search results list may be based on the following tables illustrating the user profiles associated with each candidate and each candidate's shopping interests:

TABLE 3

| User ID | User name | Name | Mobile | Occupation | Age |
|---|---|---|---|---|---|
| 1 | user001 | John | 555-555-5555 | IT | 25-30 |
| 2 | user002 | Alan | 444-444-4444 | Finance | 15-20 |
| 3 | user003 | Mary | 333-333-3333 | Education | 20-25 |
| ... | | | | | |

TABLE 4

| User ID | Category | Interest |
|---|---|---|
| 1 | Digital Camera | 0.9 |
| 1 | Smart Phone | 0.8 |
| 1 | Books | 0.7 |
| 1 | Notebook | 0.6 |
| 2 | Notebook | 0.9 |
| 2 | Smart Phone | 0.8 |
| 2 | Clothes | 0.8 |
| 3 | Notebook | 0.75 |
| 3 | Sports Shoes | 0.9 |
| ... | | |

FIG. 7B illustrates a user interface 730 that features a display 731. As shown, the user from FIG. 7A is presented with a search results list for group shopping candidates updated from the search results list provided in FIG. 7A. However, in this case, the user has removed the explanation associated with notebook interests. The user may, for instance, have removed the explanation associated with notebook interests because the particular shopping area that the user wishes to visit does not have any stores that sell notebooks. As discussed, removing an explanation may be one way of indicating that the user does not want the parameter associated with the explanation to be considered when calculating the ranking. Consequently, a removal request is initiated at the user's device and the ranking associated with the search results is recalculated. Subsequently, the user is presented with an updated search results list. Here, the notebook explanation is no longer presented to the user and Mary has been removed as a potential candidate (e.g., Mary's updated overall rank value is too low).

Figure 8A:
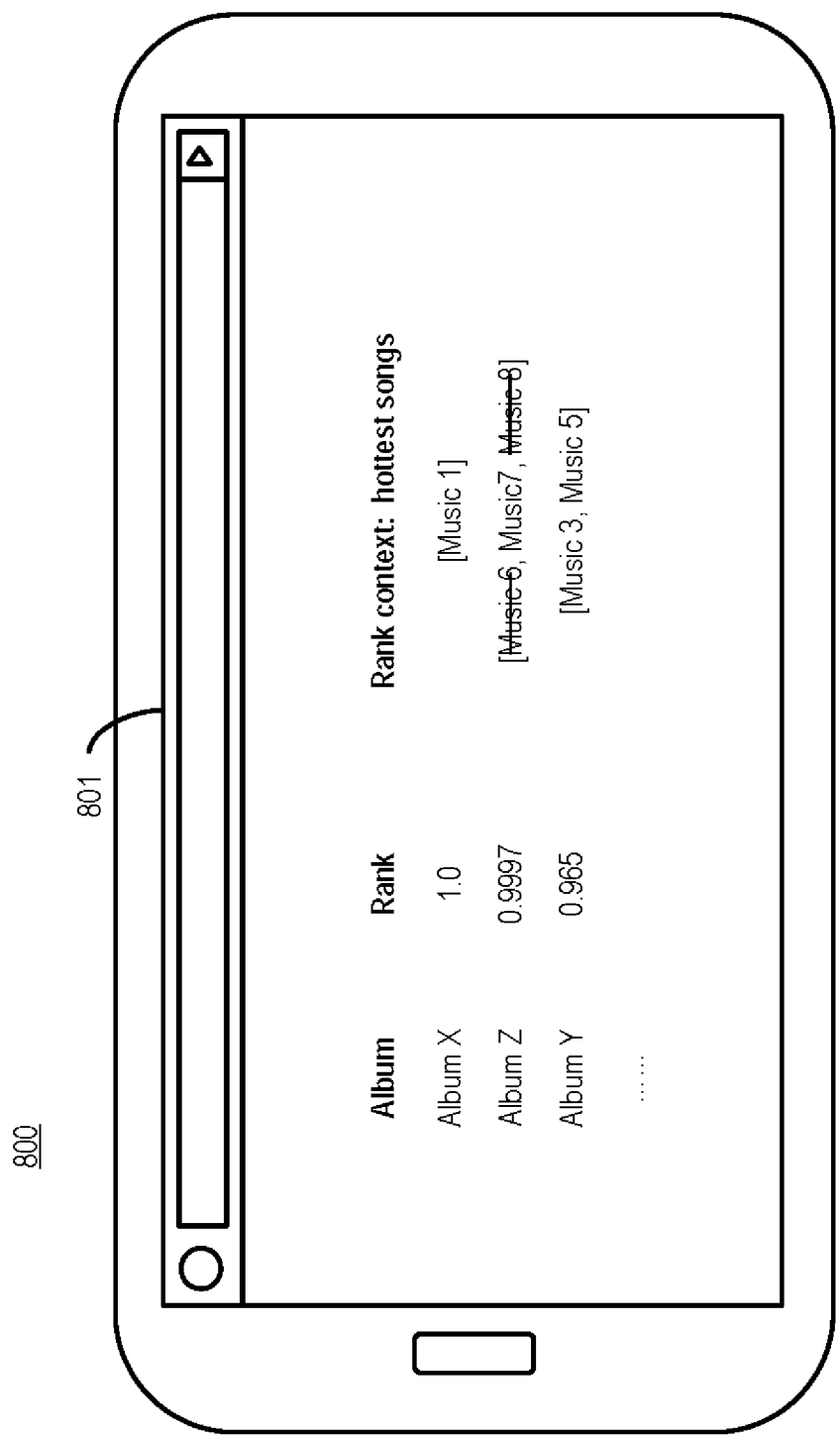
FIGS. 8A-8B are diagrams of user interfaces demonstrating music album search results utilized in the processes of FIG. 3, according to various embodiments.
Figure 8B:
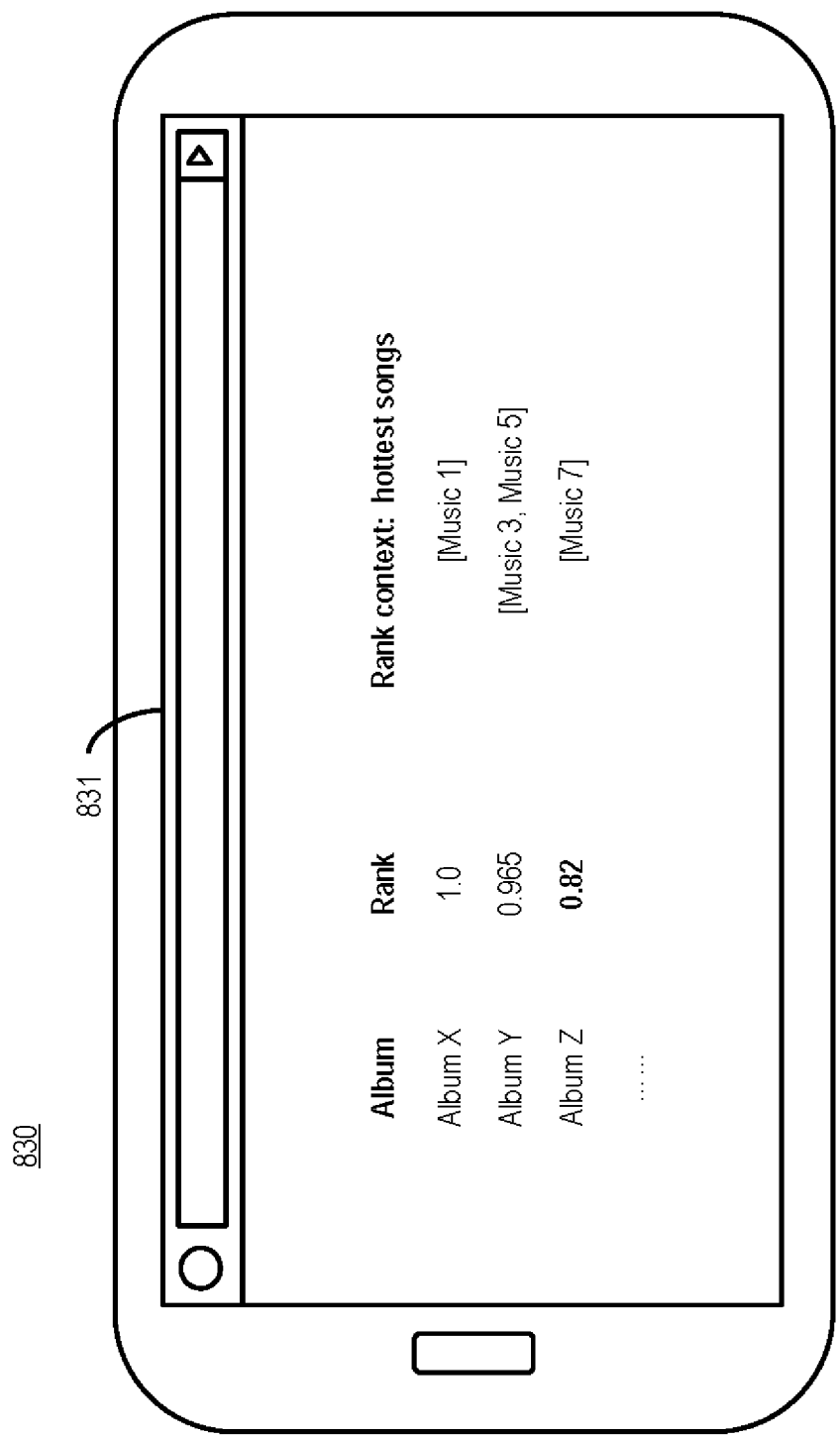

FIGS. 8A-8B are diagrams of user interfaces demonstrating music album search results utilized in the processes of FIG. 3, according to various embodiments. As shown, the user is presented with a search results list for music albums, which includes the album name and the overall rank value for a candidate along with an explanation (e.g., related to the album's "hotness") for the overall rank value. By way of example, the search results list may be based on the following table illustrating data associated with songs:

TABLE 5

| Music ID | Name | Artist | Album | Year | Hotness |
|---|---|---|---|---|---|
| 1 | Music 1 | Mary | Album X | 2008 | 1.0 |
| 2 | Music 2 | Mary | Album X | 2008 | 0.28 |
| 3 | Music 3 | Mary | Album Y | 2009 | 0.75 |
| 4 | Music 4 | Mary | Album Y | 2009 | 0.42 |
| 5 | Music 5 | Mary | Album Y | 2009 | 0.86 |
| 6 | Music 6 | Kristen | Album Z | 2010 | 0.97 |
| 7 | Music 7 | Kristen | Album Z | 2010 | 0.82 |
| 8 | Music 8 | Kristen | Album Z | 2010 | 9.95 |
| ... | | | | | |

In this case, the user has crossed out some of the songs which the user has little, or no, interest in (e.g., Music 6 and Music 8 may be popular but they do not fit the user's style). Consequently, a modification request is initiated at the user's device and the ranking associated with the search results is recalculated. It is noted that the data in Table 5 does not necessarily change (e.g., Music 6 and Music 8 may still retain the same "hotness" rating). Rather, it is the user and/or the device is that provided an updated ranking associated with the search results based on the recalculation.

FIG. 8B illustrates a user interface 830 that features a display 831. As shown, the user from FIG. 8A is presented with a search results list for music albums updated from the search results list provided in FIG. 8A. Because the user had crossed out Music 6 and Music 8 in FIG. 8A, the overall rank value for Album Z changed from 0.9997 to 0.82. Accordingly, Album Z moved down from second to third on the list and Album Y moved up from third to second on the list.

Figure 9:
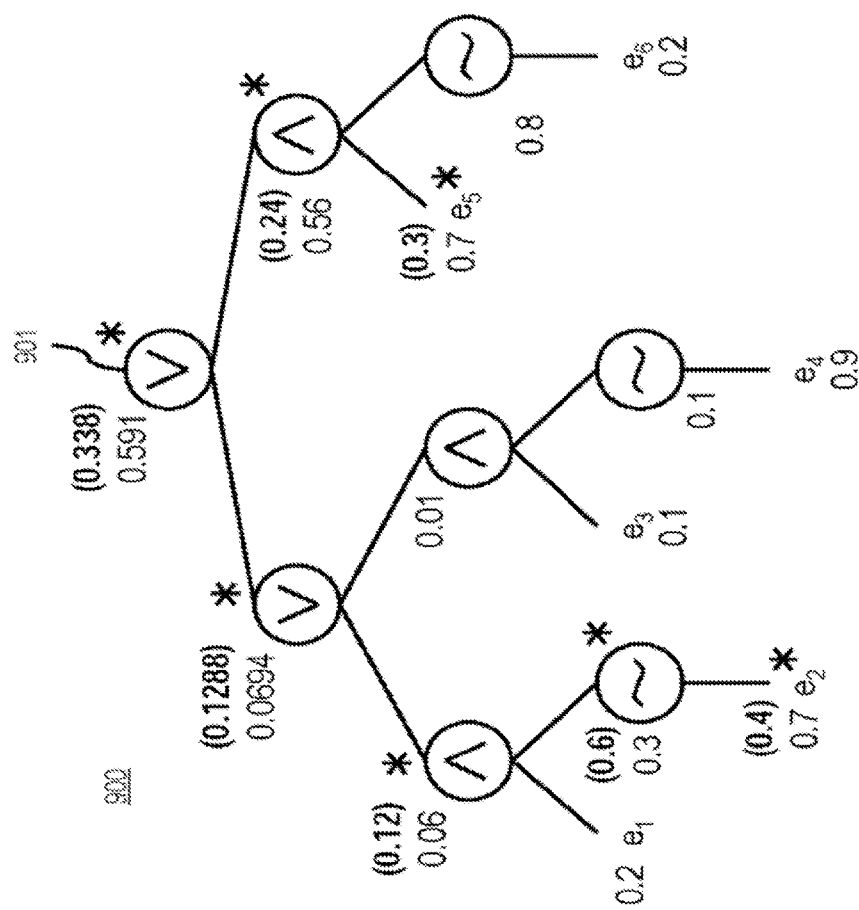
FIG. 9 is a diagram of a tree structure for providing user-corrected search results, according to one embodiment.

FIG. 9 is a diagram of a tree structure for providing user-corrected search results, according to one various embodiment. FIG. 9 illustrates the tree structure 900, which includes a root node 901, leaf nodes $e_1$, $e_2$, $e_3$, $e_4$, $e_5$, and $e_6$, and other non-leaf nodes. As shown, the expression includes independent elements corresponding to the leaf nodes $e_1$, $e_2$, $e_3$, $e_4$, $e_5$, and $e_6$ (e.g., parameters related to the ranking calculation). Prior to a request for modification and/or removal of particular parameters (e.g., parameters corresponding to the leaf nodes $e_2$ and $e_5$) and associated parameter values, the ranking was calculated based on the expression, $P((e_1 \land \sim e_2) \lor (e_3 \land e_4) \lor (e_5 \land e_6))$. Consequently, the original overall value for the root node 901 (e.g., relating to a particular search result) was 0.591. However, after the request to modify the parameters corresponding to the leaf nodes $e_2$ and $e_5$, a recalculation was performed on a subset of the tree structure. As illustrated, the recalculation is performed for the leaf nodes $e_2$ and $e_5$, the non-leaf nodes along the path to the root node 901, and the root node 901 (e.g., affected nodes are marked by "*"). Accordingly, the updated overall value for the root node 901 is 0.338.

The processes described herein for providing user-corrected search results may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
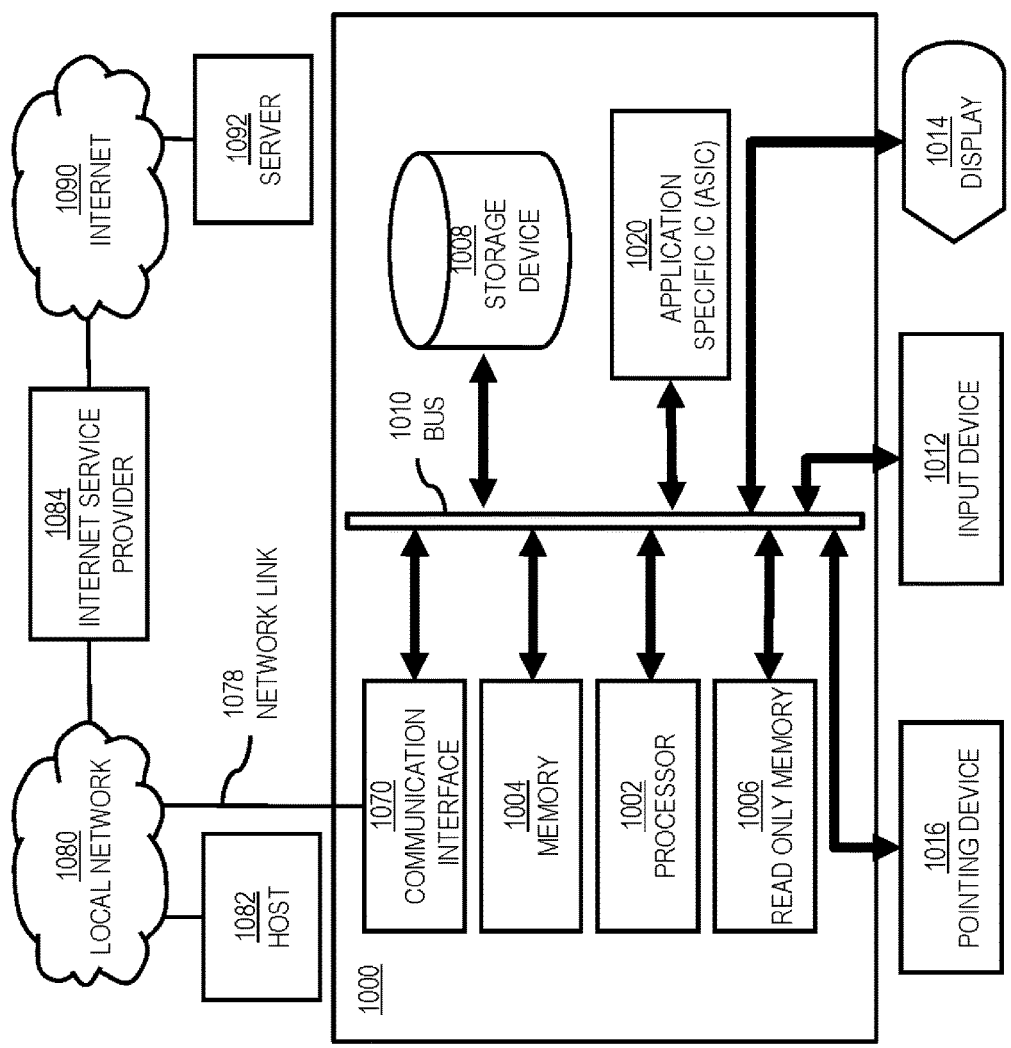
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to provide user-corrected search results as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of providing user-corrected search results.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to providing user-corrected search results. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or any other dynamic storage device, stores information including processor instructions for providing user-corrected search results. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing user-corrected search results, is provided to the bus 1010 for use by the processor from an external input device 1012, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communication interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 105 for providing user-corrected search results to the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server 1092 connected to the Internet hosts a process that provides a service in response to information received over the Internet. For example, server 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infrared transmitter to convert the instructions and data to a signal on an infrared carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to provide user-corrected search results as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of providing user-corrected search results.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to perform specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide user-corrected search results. The memory 1105 also stores the data associated with or generated by the execution of the inventive steps.

Figure 12:
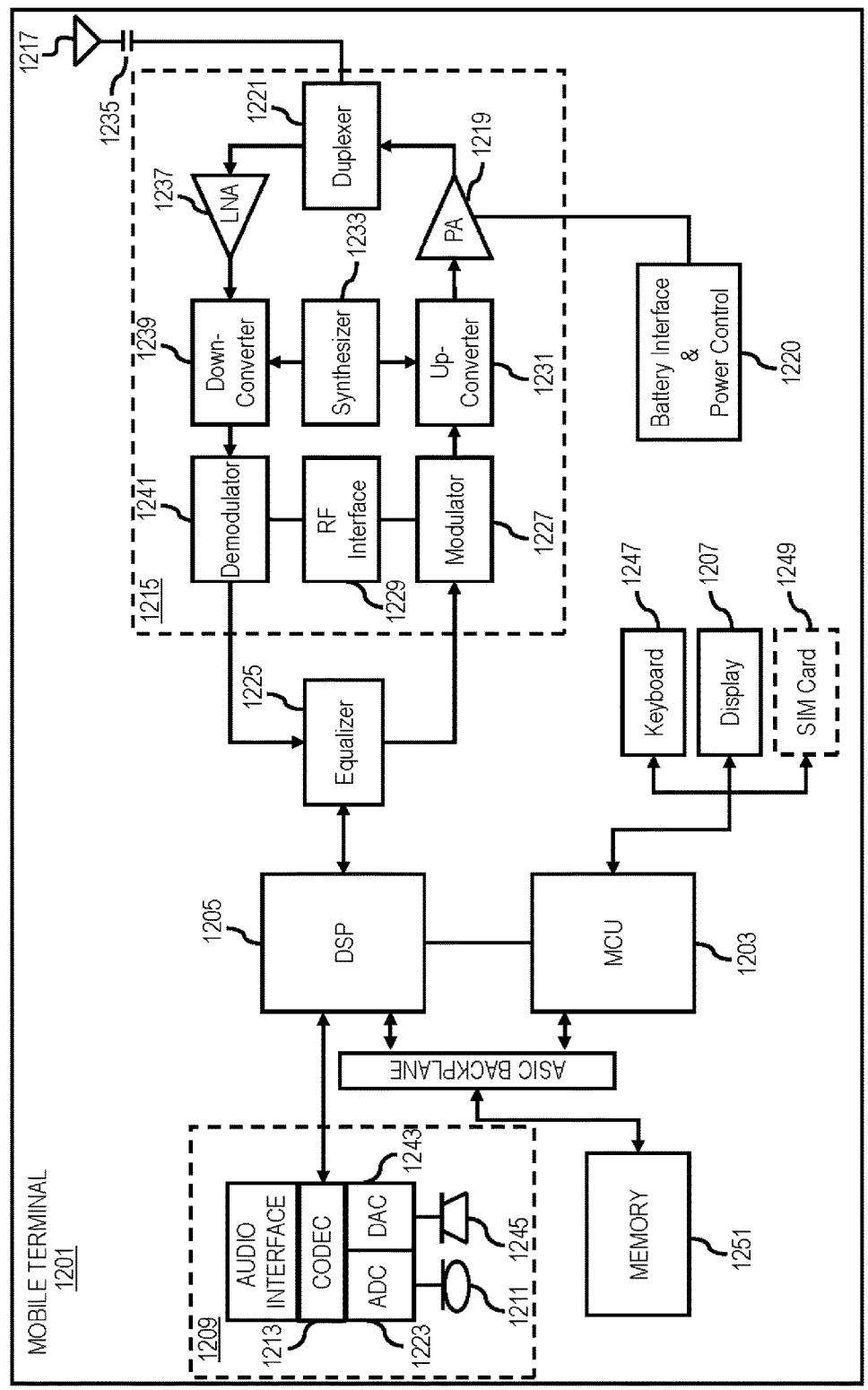
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of providing user-corrected search results. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of providing user-corrected search results. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to provide user-corrected search results. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. An apparatus comprising:
at least one processor; and
at least one memory including computer program code for one or more programs,
the at least one memory and the computer program code configured to, with the at least one processor, cause the apparatus to perform at least the following,
process and/or facilitate a processing of one or more search results to calculate an overall ranking of the one or more search results,
determine one or more parameters associated with calculating the overall ranking, one or more parameter rankings of the one or more parameters, and one or more impact values of the one or more parameters, wherein the one or more impact values represent a respective percentage that each of the one or more parameters contributes to the calculating of the overall ranking,
determine effect information related to an impact of the one or more parameters on the overall ranking,
determine to select the at least one of the one or more parameters based, at least in part, on the effect information, and
in response to determining the one or more parameters, the one or more parameter rankings, the one or more impact values, the calculated overall ranking and the selection based on the effect information, cause, at least in part, a presentation of one or more representations of the one or more processed search results, wherein the processed search results include the calculated overall ranking, one or more overall ranking values of the calculated overall ranking, the one or more selected parameter rankings associated with the calculated overall ranking, and the one or more impact values of the selected parameters.

2. An apparatus of claim 1, wherein the apparatus is further caused to:
receive a request for a modification, a removal, or a combination thereof of the one or more parameters, the one or more impact values, the one or more parameter rankings, or a combination thereof, and
cause, at least in part, a recalculation of the overall ranking based, at least in part, on the modification, the removal, or a combination thereof.

3. An apparatus of claim 2, wherein the request includes at least one assigned value by at least one user of a device initiating the presentation for updating the one or more impact values.

4. An apparatus of claim 2, wherein the apparatus is further caused to:
determine that the recalculation is for a subset of the one or more parameters, the one or more impact values, the one or more parameter rankings, or a combination thereof, wherein the subset is determined based on a predetermined number of the one or more parameters associated with highest of the one or more impact values, and
cause, at least in part, an application of the recalculation to the subset.

5. An apparatus of claim 1, wherein the ranking, the one or more parameters, the one or more impact values, the one or more parameter rankings, the presentation, or a combination thereof is for a device initiating the presentation, at least one user of the device, or a combination thereof.

6. An apparatus of claim 1, wherein the apparatus is further caused to:
   determine one or more criteria for selecting the one or more parameters,
   wherein the overall ranking is based, at least in part, on the one or more criteria.

7. An apparatus of claim 1,
   wherein the impact of at least one of the one or more parameters is associated with an influence that the at least one parameter has upon an overall rank value assigned to a search result,
   wherein a number amount of the total selected at least one of the one or more parameters is less than a number amount of the total determined one or more parameters,
   wherein the one or more representations of the one or more processed search results includes one or more identifications of the selected parameters.

8. An apparatus of claim 1, wherein the overall ranking, the one or more parameters, the one or more impact values, the one or more parameter rankings, the presentation, or a combination thereof are based, at least in part, on one or more previous modification and/or removal requests, context information, or a combination thereof associated with a device initiating the presentation, at least one user of the device, or a combination thereof.

9. An apparatus of claim 2, wherein the apparatus is further caused to:
   process and/or facilitate a processing of a search query associated with the one or more search results to formulate an expression including one or more independent elements corresponding to the one or more parameters, and
   determine to construct a tree structure including one or more leaf nodes corresponding to the one or more independent elements based, at least in part, on the expression,
      wherein the overall ranking, the recalculation of the overall ranking, or a combination thereof is based, at least in part, on the tree structure.

10. A method comprising:
    processing and/or facilitating a processing of one or more search results to calculate an overall ranking of the one or more search results;
    determining one or more parameters associated with calculating the overall ranking, one or more parameter rankings of the one or more parameters, and one or more impact values of the one or more parameters, wherein the one or more impact values represent a respective percentage that each of the one or more parameters contributes to the calculating of the overall ranking;
    determining effect information related to an impact of the one or more parameters on the overall ranking;
    determining to select the at least one of the one or more parameters based, at least in part, on the effect information; and
    in response to determining the one or more parameters, the one or more parameter rankings, the one or more impact values, the calculated overall ranking and the selection based on the effect information, causing, at least in part, a presentation of one or more representations of the one or more processed search results,
       wherein the processed search results include the calculated overall ranking, one or more overall ranking values of the calculated overall ranking, the one or more selected parameter rankings associated with the calculated overall ranking, and the one or more impact values of the selected parameters.

11. A method of claim 10, further comprising:
    receiving a request for a modification, a removal, or a combination thereof of the one or more parameters, the one or more impact values, the one or more parameter rankings, or a combination thereof; and
    causing, at least in part, a recalculation of the overall ranking based, at least in part, on the modification, the removal, or a combination thereof.

12. A method of claim 11, wherein the request includes at least one assigned value by at least one user of a device initiating the presentation for updating the one or more impact values.

13. A method of claim 11, further comprising:
    determining that the recalculation is for a subset of the one or more parameters, the one or more impact values, the one or more parameter rankings, or a combination thereof, wherein the subset is determined based on a predetermined number of the one or more parameters associated with highest of the one or more impact values; and
    causing, at least in part, an application of the recalculation to the subset.

14. A method of claim 10, wherein the ranking, the one or more parameters, the one or more impact values, the one or more parameter rankings, the presentation, or a combination thereof is for a device initiating the presentation, at least one user of the device, or a combination thereof.

15. A method of claim 10, further comprising:
    determining one or more criteria for selecting the one or more parameters,
       wherein the overall ranking is based, at least in part, on the one or more criteria.

16. A method of claim 10,
    wherein the impact of at least one of the one or more parameters is associated with an influence that the at least one parameter has upon an overall rank value assigned to a search result,
    wherein a number amount of the total selected at least one of the one or more parameters is less than a number amount of the total determined one or more parameters,
    wherein the one or more representations of the one or more processed search results includes one or more identifications of the selected parameters.

17. A method of claim 10, wherein the overall ranking, the one or more parameters, the one or more impact values, the one or more parameter rankings, the presentation, or a combination thereof are based, at least in part, on one or more previous modification and/or removal requests, context information, or a combination thereof associated with a device initiating the presentation, at least one user of the device, or a combination thereof.

18. A method of claim 11, further comprising:
    processing and/or facilitating a processing of a search query associated with the one or more search results to formulate an expression including one or more independent elements corresponding to the one or more parameters; and
    determining to construct a tree structure including one or more leaf nodes corresponding to the one or more independent elements based, at least in part, on the expression,
       wherein the overall ranking, the recalculation of the overall ranking, or a combination thereof is based, at least in part, on the tree structure.

19. A non-transitory computer-readable medium comprising a computer program product including one or more sequences of one or more instructions which, when executed by one or more processors, cause an apparatus to at least perform the steps:

processing and/or facilitating a processing of one or more search results to calculate an overall ranking of the one or more search results;

determining one or more parameters associated with calculating the overall ranking, one or more parameter rankings of the one or more parameters, and one or more impact values of the one or more parameters, wherein the one or more impact values represent a respective percentage that each of the one or more parameters contributes to the calculating of the overall ranking;

determining effect information related to an impact of the one or more parameters on the overall ranking;

determining to select the at least one of the one or more parameters based, at least in part, on the effect information; and in response to determining the one or more parameters, the one or more parameter ranking values, the one or more impact values, the calculated overall ranking and the selection based on the effect information, causing, at least in part, a presentation of one or more representations of the one or more processed search results, wherein the processed search results include the calculated overall ranking, one or more overall ranking values of the calculated overall ranking, the one or more selected parameter rankings associated with the calculated overall ranking, and the one or more impact values of the selected parameters.

20. A non-transitory computer-readable medium comprising a computer program product of claim 19, wherein the apparatus is caused, at least in part, to further perform:

receiving a request for a modification, a removal, or a combination thereof of the one or more parameters, the one or more impact values, the one or more parameter ranking values, or a combination thereof; and causing, at least in part, a recalculation of the overall ranking based, at least in part, on the modification, the removal, or a combination thereof, wherein the impact of at least one of the one or more parameters is associated with an influence that the at least one parameter has upon an overall rank value assigned to a search result, wherein a number amount of the total selected at least one of the one or more parameters is less than a number amount of the total determined one or more parameters, wherein the one or more representations of the one or more processed search results includes one or more identifications of the selected parameters.

* * * * *